United States Patent
Zeng

(10) Patent No.: US 11,867,347 B2
(45) Date of Patent: Jan. 9, 2024

(54) LASER MODULE LIFTING APPARATUS WITH PROTECTING FUNCTION

(71) Applicant: Dongguan Ortur Intelligent Technologies Co., Ltd., Dongguan (CN)

(72) Inventor: Weixu Zeng, Xinhua (CN)

(73) Assignee: DONGGUAN ORTUR INTELLIGENT TECHNOLOGIES CO., LTD., Dongguan (CN)

( * ) Notice: Subject to any disclaimer, the term of this patent is extended or adjusted under 35 U.S.C. 154(b) by 33 days.

(21) Appl. No.: 17/647,467

(22) Filed: Jan. 10, 2022

(65) Prior Publication Data

US 2022/0128189 A1    Apr. 28, 2022

(30) Foreign Application Priority Data

Nov. 16, 2021 (CN) .......................... 202122800867.3

(51) Int. Cl.
F16M 11/04 (2006.01)

(52) U.S. Cl.
CPC ..... F16M 11/046 (2013.01); *F16M 2200/025* (2013.01)

(58) Field of Classification Search
CPC ................. F16M 11/18; F16M 11/046; F16M 2200/025; F16M 2200/028; F16M 2200/027; G01S 13/931
See application file for complete search history.

(56) References Cited

U.S. PATENT DOCUMENTS

| | | | | |
|---|---|---|---|---|
| 4,035,084 A * | 7/1977 | Ramsay | ................ | G01B 11/26 356/139.08 |
| 7,063,296 B2 * | 6/2006 | Williams | ........... | F16M 11/2092 248/244 |
| 7,703,725 B2 * | 4/2010 | May | ....................... | F16M 11/42 248/431 |
| 8,888,056 B2 * | 11/2014 | Lu | ....................... | F16M 11/2014 248/162.1 |
| 9,125,502 B2 * | 9/2015 | Gwag | ................... | A47F 5/0846 |
| 9,732,780 B2 * | 8/2017 | Anderson | ............... | F16B 7/187 |
| 10,376,042 B1 * | 8/2019 | Johnson | ................. | F16M 11/06 |
| 10,514,278 B1 * | 12/2019 | Becker | ................... | G01D 11/30 |
| 10,883,656 B1 * | 1/2021 | Follis | ..................... | F16M 11/18 |
| 11,154,980 B2 * | 10/2021 | Wang | ....................... | B25H 5/00 |
| 11,262,176 B2 * | 3/2022 | Wang | ....................... | G01S 7/40 |
| 11,480,289 B2 * | 10/2022 | Millane | ................. | F16M 11/16 |
| 11,480,290 B2 * | 10/2022 | Johnson, Sr. | .......... | F16M 11/16 |

(Continued)

*Primary Examiner* — Patrick D Hawn
(74) *Attorney, Agent, or Firm* — Zhigang Ma

(57) ABSTRACT

The present invention discloses a laser module lifting apparatus with a protecting function. The apparatus comprises a slide block for being fixedly connected with a laser module. The slide block is provided with a sliding groove, and the sliding groove is provided with a lifting slide rail in a liftable manner. A locking block is arranged between the lifting slide rail and an inner side wall of the sliding groove, and a side of the locking block away from the lifting slide rail is provided with a locking screw. By arranging the locking block at a locking end of the locking screw, a conventional way of jacking the lifting slide rail directly by using the locking screw is converted into a way of jacking the lifting slide rail by the locking block.

7 Claims, 3 Drawing Sheets

(56) References Cited

U.S. PATENT DOCUMENTS

| | | | |
|---|---|---|---|
| 2012/0228440 A1* | 9/2012 | Jahnke | F16M 11/10 248/125.1 |
| 2014/0328359 A1 | 11/2014 | Yano | |
| 2016/0190763 A1 | 6/2016 | Kakizaki et al. | |
| 2016/0248219 A1 | 8/2016 | Wakabayashi et al. | |
| 2020/0341113 A1* | 10/2020 | Shen | G01S 13/931 |
| 2020/0344466 A1* | 10/2020 | Huang | G06T 7/80 |
| 2020/0353613 A1* | 11/2020 | Wang | F16M 11/046 |
| 2022/0128789 A1* | 4/2022 | Zeng | G02B 19/0009 |
| 2022/0260896 A1* | 8/2022 | Chan | F16B 2/12 |
| 2023/0017652 A1* | 1/2023 | Gabbard | F16M 11/247 |

* cited by examiner

LASER MODULE LIFTING APPARATUS WITH PROTECTING FUNCTION

BACKGROUND OF THE INVENTION

1. Technical Field

The present invention relates to the field of lifting apparatuses, in particular to a laser module lifting apparatus with a protecting function. It is primarily applied to, but not limited to, a laser module.

2. Description of Related Art

An existing laser module is mounted on a rack in an up-down lifting adjusting manner and the laser module usually ascends and descends up and down by matching a slide block with a slide rail. However, the lifting structure is often limited and fixed by using a locking screw directly jacking the slide block. In a long-term using process, there is a problem of unsmooth sliding and reduced positioning precision because the locking screw is to jack the lifting slide rail or slide rail with a depression. The service life of the lifting slide block (slide rail) is shortened.

Thus, it is necessary to research a novel technical scheme to solve the above-mentioned problem.

BRIEF SUMMARY OF THE INVENTION

In order to overcome defects and shortcomings in the prior art, the present invention provides a laser module lifting apparatus with a protecting function. By arranging the locking block at a locking end of the locking screw, a conventional way of jacking the lifting slide rail directly by using the locking screw is converted into a way of jacking the lifting slide rail by the locking block, i.e., point contact type locking is improved to surface contact type locking, so that a problem of unsmooth sliding and reduced positioning precision because the locking screw is to jack the lifting slide rail with a depression in the prior art is solved. Meanwhile, the service life of the lifting slide rail is also prolonged, and the positioning precision is guaranteed.

In order to achieve the objective, the present invention adopts a technical scheme below: a laser module lifting apparatus with a protecting function includes a slide block for being fixedly connected with a laser module, wherein the slide block is provided with a sliding groove, and the sliding groove is provided with a lifting slide rail in a liftable manner;

a locking block is arranged between the lifting slide rail and an inner side wall of the sliding groove, and a side of the locking block away from the lifting slide rail is provided with a locking screw; and during use, the locking screw is twisted, so that the locking screw pushes the locking block to move towards the side of the lifting slide rail and contact with the lifting slide rail, and therefore, the slide block and the lifting slide rail are locked.

As a preferred scheme, when the locking block contacts with the lifting slide rail, it is plane contact.

As a preferred scheme, the locking block is made from stainless steel.

As a preferred scheme, the locking block is 'L'-shaped and is provided with a mounting portion and a limiting portion extending perpendicularly from a side edge of the mounting portion, wherein the mounting portion is connected to an upper side surface or a lower side surface of the slide block; and when the locking block is locked, the locking screw acts to the limiting portion, and the limiting portion and the lifting slide rail contact to lock.

As a preferred scheme, the mounting portion is provided with a first connecting hole, and the upper side surface or the lower side surface of the slide block is provided with a second connecting hole matched with a first connecting hole; and during mounting, the first connecting hole and the second connecting hole are connected via a connecting screw.

As a preferred scheme, the sliding groove is a dovetail groove, and correspondingly, the lifting slide rail is provided with a dovetail column matched with the dovetail groove.

As a preferred scheme, the slide block and the lifting slide rail are both made from aluminum products.

As a preferred scheme, the slide block is provided with a first mounting hole for being fixedly connected with the laser module, and the lifting slide rail is provided with a second mounting hole for being fixedly connected with a rack.

Compared with the prior art, the present invention has obvious advantages and beneficial effects. Specifically speaking, it may be known from the above-mentioned technical scheme, by mainly arranging the locking block at a locking end of the locking screw, a conventional way of jacking the lifting slide rail directly by using the locking screw is converted into a way of jacking the lifting slide rail by the locking block, i.e., point contact type locking is improved to surface contact type locking, so that a problem of unsmooth sliding and reduced positioning precision because the locking screw is to jack the lifting slide rail with a depression in the prior art is solved. Meanwhile, the service life of the lifting slide rail is also prolonged, and the positioning precision is guaranteed; and secondly, the laser module lifting apparatus of the present invention is relatively simple in overall structure and has the advantages of being convenient to assemble, easy to implement, low in manufacturing cost, convenient to adjust and the like.

In order to explain structural features and functions of the present invention more clearly, further description in detail on the present invention will be made in combination with drawings and specific embodiments below.

DESCRIPTION OF NUMERALS IN DRAWINGS 10, slide block; 11, first mounting hole; 12, sliding groove; 20, lifting slide rail; 21, first mounting hole; 30, locking block; 31, mounting portion; 32, limiting portion; 40, locking screw.

DETAILED DESCRIPTION OF THE INVENTION

Clear and intact description will be made on technical scheme in the embodiment of the present invention below in combination with drawings. Apparently, the described embodiments are merely preferred embodiments of the present invention.

Figure 1:
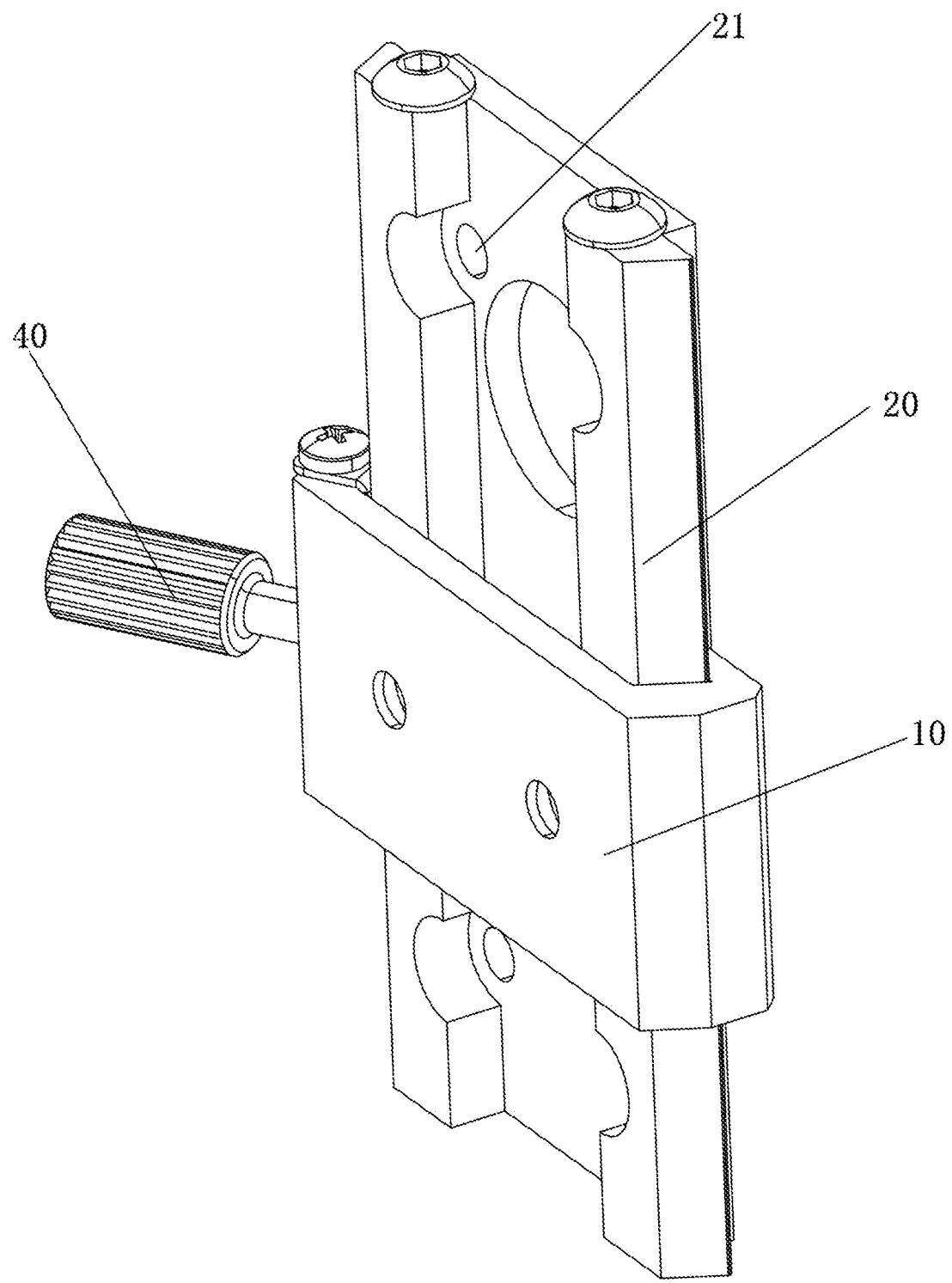
FIG. 1 is a stereogram of an embodiment of the present invention.
Figure 2:
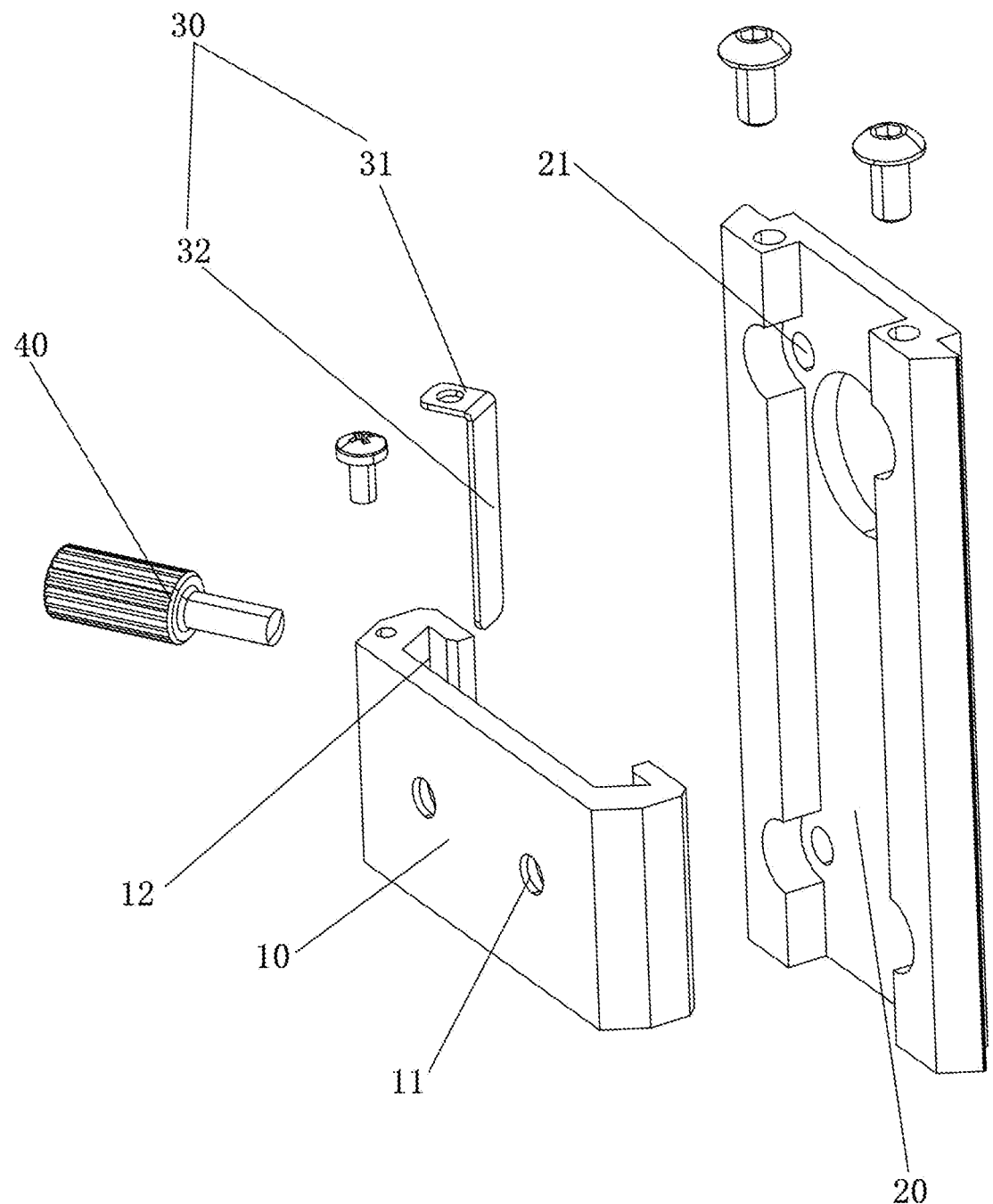
FIG. 2 is an exploded view of an embodiment of the present invention.
Figure 3:
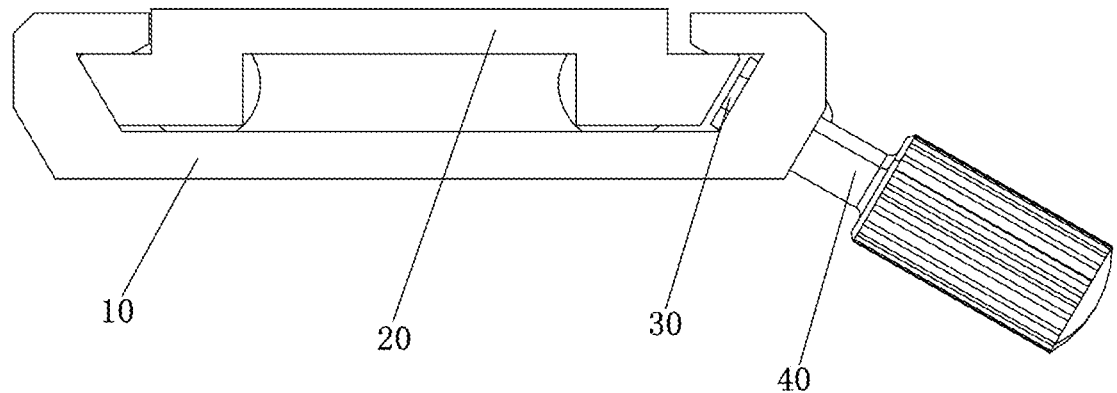
FIG. 3 is a top view diagram of an embodiment of the present invention.
Figure 4:
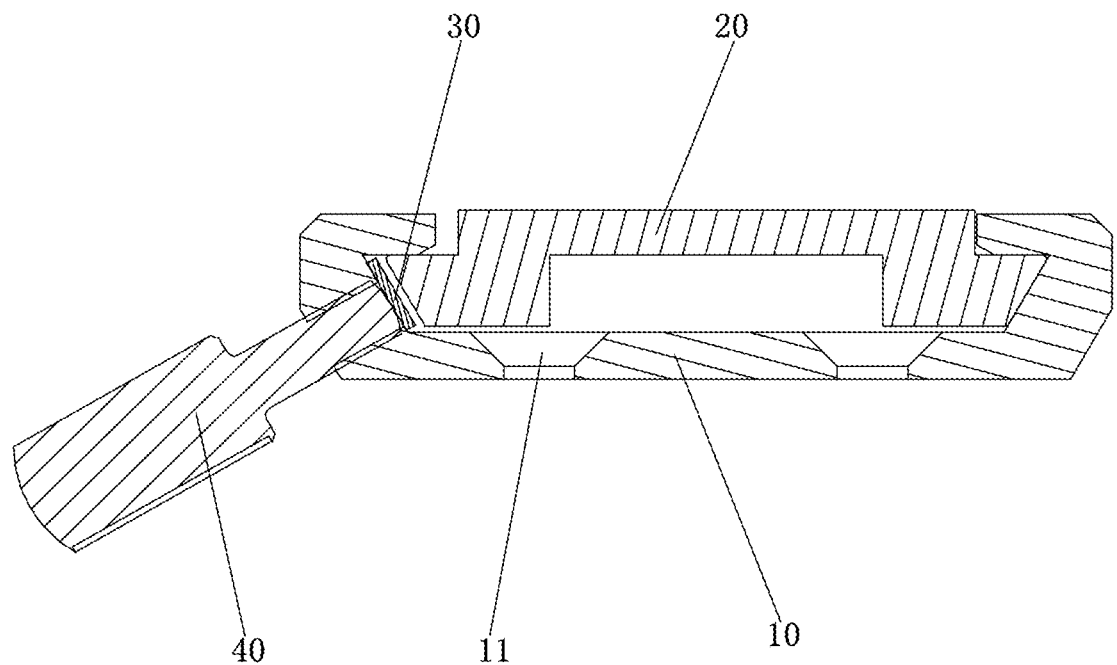
FIG. 4 is a cross section diagram of an embodiment of the present invention.

Referring to FIG. 1 to FIG. 4, a laser module lifting apparatus with a protecting function in the embodiment of the present invention includes a slide block 10 for being fixedly connected with a laser module, wherein the slide block 10 is provided with a sliding groove 12, and the sliding groove 12 is provided with a lifting slide rail 20 in a liftable manner;

a locking block 30 is arranged between the lifting slide rail 20 and an inner side wall of the sliding groove 12, and a side of the locking block 30 away from the lifting slide rail 20 is provided with a locking screw 40; and during use, the locking screw 40 is twisted, so that the locking screw pushes the locking block 30 to move towards the side of the lifting slide rail 20 and contact with the lifting slide rail 20, and therefore, the slide block 10 and the lifting slide rail 20 are locked.

Thus, by arranging the locking block 30 at a locking end of the locking screw 40, a conventional way of jacking the lifting slide rail 20 directly by using the locking screw 40 is converted into a way of jacking the lifting slide rail 20 by the locking block 30, i.e., point contact type locking is improved to surface contact type locking, so that a problem of unsmooth sliding and reduced positioning precision because the locking screw 40 is to jack the lifting slide rail 20 with a depression in the prior art is solved. Meanwhile, the service life of the lifting slide rail 20 is also prolonged, and the positioning precision is guaranteed.

Preferably, when the locking block 30 contacts with the lifting slide rail 20, it is plane contact, i.e., surfaces of the locking block 30 and the lifting slide rail 20 contacted with each other are smooth planes matched with each other.

Usually, the locking block 30 is made from stainless steel. In an actual application, in order to draw materials conveniently, the locking screw 40 is usually made from steel, the hardness of which is higher than that of an aluminum product. The lifting slide rail 20 and the slide block 10 are usually made from aluminum products. Therefore, as far as an existing locking mode is concerned, damage to the lifting slide rail 20 by the locking screw 40 is more prominent.

In the embodiment, the locking block 30 is 'L'-shaped and is provided with a mounting portion 31 and a limiting portion 32 extending perpendicularly from a side edge of the mounting portion 31, wherein the mounting portion 31 is connected to an upper side surface or a lower side surface of the slide block 10; and when the locking block is locked, the locking screw 40 acts to the limiting portion 32, and the limiting portion 32 and the lifting slide rail 20 contact to lock. Preferably, the mounting portion 31 is provided with a first connecting hole, and the upper side surface or the lower side surface of the slide block 10 is provided with a second connecting hole matched with a first connecting hole; and during mounting, the first connecting hole and the second connecting hole are connected via a connecting screw. Thus, by connecting the mounting portion 31 of the locking block 30 to the slide block 10, the limiting portion 32 of the locking block 30 may further keep a certain activity. When the locking screw 40 is twisted, the locking screw 40 may push the limiting portion 32 to lock the lifting slide rail 20. Of course, the mounting portion 31 of the locking block 30 may further be movably connected to the slide block 10. An improved objective of the present invention may be realized as long as it is ensured that the locking block 30 has a certain activity.

Specifically, the sliding groove 12 is a dovetail groove, and correspondingly, the lifting slide rail 20 is provided with a dovetail column matched with the dovetail groove.

As mentioned above, the slide block 10 and the lifting slide rail 20 are both made from aluminum products, and have the advantages of being convenient to draw materials, light in weight and difficult to oxidize in a natural environment.

Further, the slide block 10 is provided with a first mounting hole 11 for being fixedly connected with the laser module, and the lifting slide rail 20 is provided with a second mounting hole 21 for being fixedly connected with a rack. When being mounted, the slide block 10 is fixedly connected with the laser module via the first mounting hole 11 and the second mounting hole 21, and the lifting slide rail 20 is fixedly connected to the rack, so that a lifting adjusting motion of the laser module relative to the rack may be realized.

A design keypoint of the present invention lies in that by mainly arranging the locking block at a locking end of the locking screw, a conventional way of jacking the lifting slide rail directly by using the locking screw is converted into a way of jacking the lifting slide rail by the locking block, i.e., point contact type locking is improved to surface contact type locking, so that a problem of unsmooth sliding and reduced positioning precision because the locking screw is to jack the lifting slide rail with a depression in the prior art is solved. Meanwhile, the service life of the lifting slide rail is also prolonged, and the positioning precision is guaranteed; and secondly, the laser module lifting apparatus of the present invention is relatively simple in overall structure and has the advantages of being convenient to assemble, easy to implement, low in manufacturing cost, convenient to adjust and the like.

The above is merely preferred embodiments of the present invention and is not limited to the technical scope of the present invention. Any subtle modifications, equivalent changes and modifications made on the embodiments in accordance with the technical substance of the present invention shall come within the scope of the technical scheme of the present invention.

What is claimed is:

1. A laser module lifting apparatus with a protecting function, characterized by comprising a slide block for being fixedly connected with a laser module, wherein the slide block is provided with a sliding groove, and a lifting slide rail slidably arranged in the sliding groove;

a locking block is arranged between the lifting slide rail and an inner side wall of the sliding groove, and a side of the locking block away from the lifting slide rail is provided with a locking screw; and during use, the locking screw is twisted, so that the locking screw pushes the locking block to move towards the side of the lifting slide rail and contact with the lifting slide rail, and therefore, the slide block and the lifting slide rail are locked;

wherein the locking block is 'L'-shaped and is provided with a mounting portion and a limiting portion extending perpendicularly from a side edge of the mounting portion, wherein the mounting portion is connected to an upper side surface or a lower side surface of the slide block, the limiting portion is in a long strip shape and extends in the sliding groove in a length direction of the sliding groove from the upper side surface or the lower side surface, wherein the length direction of the sliding groove is from one of the upper side surface and the lower side surface to the other one of the upper side surface and the lower side surface; and when the locking block is locked, the locking screw resists against one side surface of the limiting portion so that another side surface of the limiting portion resists against the lifting slide rail.

2. The laser module lifting apparatus with a protecting function according to claim 1, characterized in that when the locking block contacts with the lifting slide rail, it is plane contact.

3. The laser module lifting apparatus with a protecting function according to claim 1, characterized in that the locking block is made from stainless steel.

4. The laser module lifting apparatus with a protecting function according to claim 1, characterized in that the mounting portion is provided with a first connecting hole, and the upper side surface or the lower side surface of the slide block is provided with a second connecting hole matched with a first connecting hole; and during mounting, the first connecting hole and the second connecting hole are connected via a connecting screw.

5. The laser module lifting apparatus with a protecting function according to claim 1, characterized in that the sliding groove is a dovetail groove, and correspondingly, the lifting slide rail is provided with a dovetail column matched with the dovetail groove.

6. The laser module lifting apparatus with a protecting function according to claim 1, characterized in that the slide block and the lifting slide rail are both made from aluminum products.

7. The laser module lifting apparatus with a protecting function according to claim 1, characterized in that the slide block is provided with a first mounting hole for being fixedly connected with the laser module, and the lifting slide rail is provided with a second mounting hole for being fixedly connected with a rack.

* * * * *